United States Patent [19]
Mares

[11] Patent Number: 4,589,668
[45] Date of Patent: May 20, 1986

[54] WHEELED CART WITH REMOVABLE SKIS

[76] Inventor: Edwin H. Mares, 3641 W. 31st St., Chicago, Ill. 60623

[21] Appl. No.: 572,559

[22] Filed: Jan. 20, 1984

[51] Int. Cl.[4] .......................... B62B 13/18; B62B 1/20
[52] U.S. Cl. .......................................... 280/8; 280/10; 280/47.24; 280/659
[58] Field of Search ................... 280/8, 10, 7.12, 7.14, 280/13, 14, 659, 47.17, 47.24, 7.13; 384/215, 426, 438, 439; 403/346, 347, 373

[56] References Cited

U.S. PATENT DOCUMENTS

| | | | |
|---|---|---|---|
| 479,708 | 7/1892 | Fransmann | 280/13 |
| 1,286,330 | 12/1918 | Jantzen | 280/8 |
| 1,693,862 | 12/1928 | Otto | 280/8 |
| 2,467,644 | 4/1949 | Wright et al. | 280/5.24 |
| 2,589,602 | 3/1952 | Clark | 280/13 |
| 2,926,923 | 1/1958 | Browne | 280/8 |
| 3,046,031 | 7/1962 | Reynolds | 280/47.26 |
| 3,179,433 | 4/1965 | Flack | 280/8 |
| 3,552,514 | 1/1971 | Alpers | 180/5 |
| 4,116,455 | 9/1978 | Dotson et al. | 280/7.12 |
| 4,163,564 | 8/1979 | Kramer | 280/10 |
| 4,251,085 | 2/1981 | Lageer et al. | 280/10 |

FOREIGN PATENT DOCUMENTS

| | | | |
|---|---|---|---|
| 650745 | 9/1937 | Fed. Rep. of Germany | 280/8 |
| 80819 | 10/1952 | Norway | 280/10 |
| 83857 | 4/1954 | Norway | 280/8 |

Primary Examiner—David M. Mitchell
Assistant Examiner—Eric D. Culbreth
Attorney, Agent, or Firm—Burmeister, York, Palmatier, Hamby & Jones

[57] ABSTRACT

A cart for use on a bare surface or a snow covered surface provided with a pair of wheels journaled at opposite ends of an axle to engage the bare surface and a pair of depending skis pivotally mounted between the wheels on the axle for engaging a snow covered surface, the radius of the wheels being between one-half and three inches greater than the distance between the axle and the load carrying surface of the skis.

4 Claims, 5 Drawing Figures

U.S. Patent    May 20, 1986    4,589,668
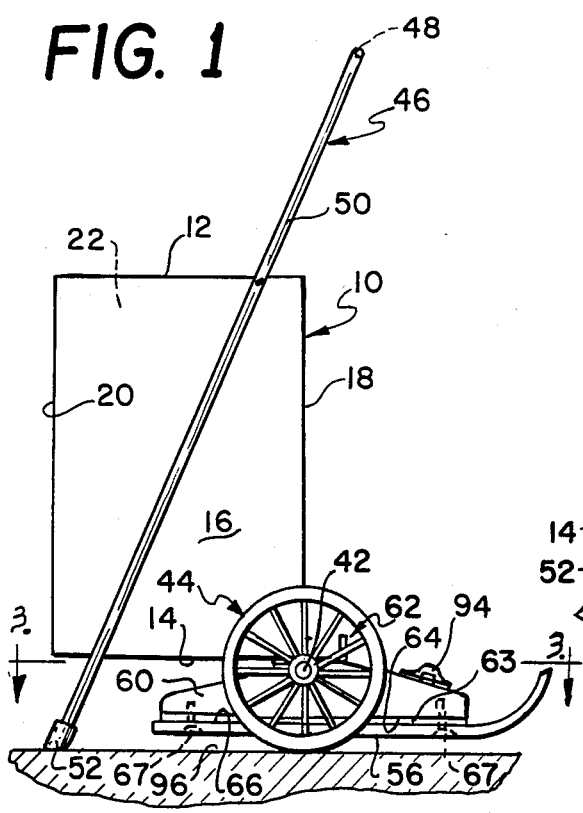
FIG. 1
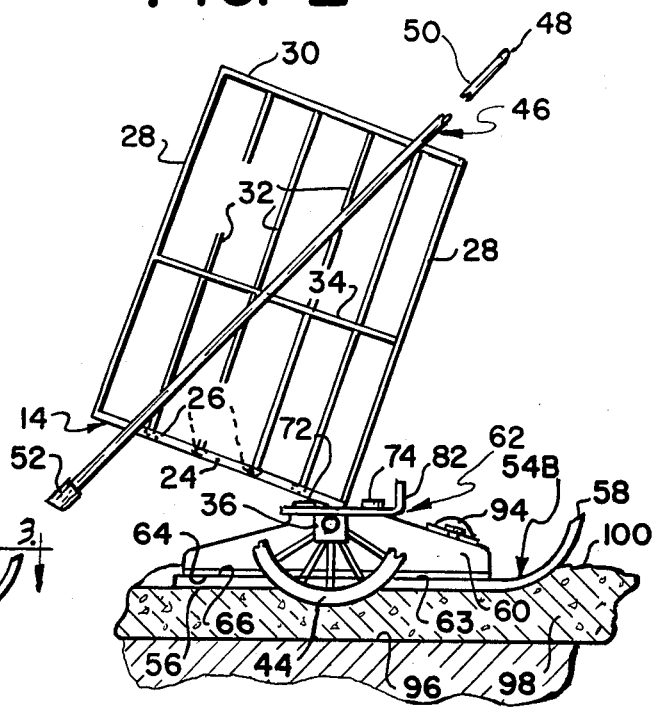
FIG. 2
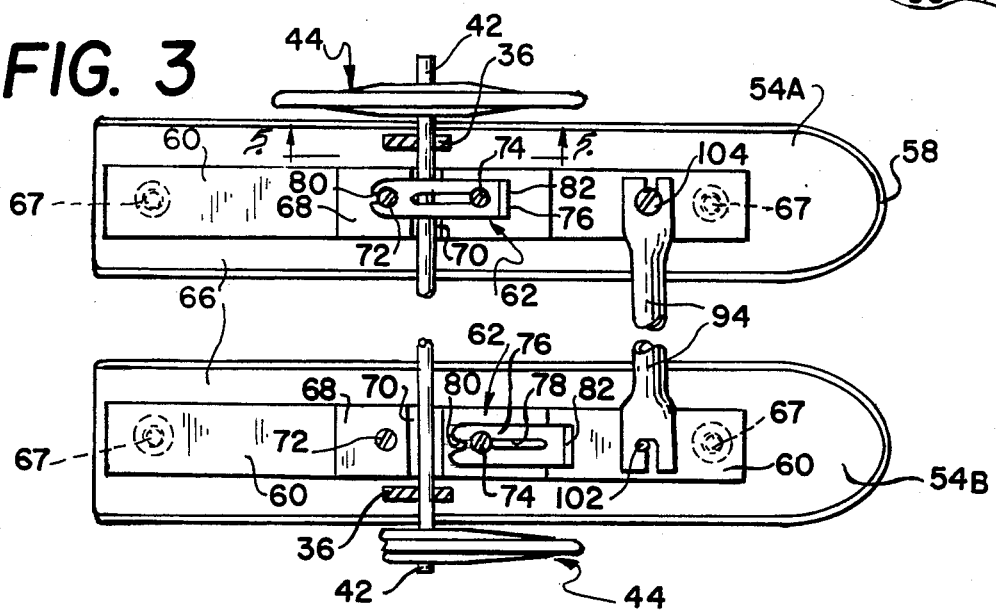
FIG. 3
FIG. 4
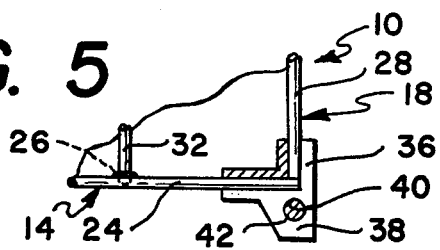
FIG. 5

WHEELED CART WITH REMOVABLE SKIS

This invention relates to wheeled carts which are provided with runners for use on snow covered surfaces.

In most regions which experience snow, there are roadways or walkways which are partially covered with snow and partially cleared of snow. Such surfaces are difficult to traverse with a wheeled vehicle, and they are also difficult to traverse with a vehicle provided with skis, since the wheels work well only on cleared or bare surfaces and the skis work well only on the snow covered surfaces.

The prior art is familiar with convertible vehicles, that is, a vehicle which may be converted from a vehicle supported on wheels for use on a bare surface to a vehicle supported on skis for use on a snow covered surface. The U.S. Pat. No. 2,589,602 to E. L. R. Clark entitled SKI ATTACHMENT FOR WHEELED VEHICLES, and U.S. Pat. No. 3,179,433 to E. J. Flack entited Toy Vehicle are examples of this prior art. In addition, U.S. Pat. No. 2,926,923 to P. W. Browne entitled CAN, BOTTLE, AND RUBBISH Container, and U.S. Pat. No. 3,552,514 to F. Tomita entitled FRONT WHEEL DEVICE FOR SNOWMOBILES also disclose devices in which either a ski is used or a wheel is used to support a vehicle, but the two are not used at the same time.

It is an object of the present invention to provide a cart with attached wheels and attached skis in which either the skis or the wheels may engage a surface without modification or adjustment to the structure. With such a structure, the vehicle can be used alternately on bare and snow covered surfaces without modification. This is particularly valuable to city dwellers who use shopping carts to carry merchandise from stores to their homes across streets and sidewalks. Under such circumstances, it is not practical to install skis on a cart for the portion of the journey over snow covered surfaces and to remove those skis for the portion of the journey over bare surfaces or for use within a store or building.

When snow conditions are not present, however, the skis are no longer useful, and it is desirable to remove the skis from the cart. It is therefor a further object of the present invention to provide a cart with permanently attached wheels and removably attached skis, the art being functional during periods in which the skis are attached thereto to traverse snow covered surfaces or bare surfaces.

The objects of the present invention are achieved by a cart in which a pair of wheels are mounted on a depending axle and adapted to engage a surface upon which the cart is to be moved, and the axle further pivotally supports a ski with the center of gravity of the ski directly below the axle, the ski depending from the axle but being spaced from th surface upon which the cart is disposed by a distance of one half to three inches.

When the cart is being used on a bare surface, the ski will be balanced directly below the axle with the flat surface of the ski substantially parallel to the surface, and th ski will not interfere with movement of the cart. If the surface becomes covered with snow to a sufficient depth the wheels of the cart will sink into the soft snow and cause the ski to engage the snow and provide the support for the cart.

The foregoing objects and advantages of the present invention, together with additional advantages, will be readily apparent from the following specification, particularly viewed in the light of the drawings, in which:

FIG. 1 is a side elevational view of a cart constructed according to the teachings of the present invention, the cart being disposed upon a bare, solid surface;

FIG. 2 is a side elevational view of the cart of FIG. 1 resting upon a snow covered surface;

FIG. 3 is a sectional view taken along the line 3—3 of FIG. 1, the one ski and wheel only being illustrated in locked position;

FIG. 4 is a sectional view taken along the same plane as FIG. 3 illustrating the other wheel and ski in unlocked position; and FIG. 5 is a fragmentary sectional view taken along the line 5—5 of FIG. 3.

FIG. 1 illustrates a shopping cart with a basket 10 with an open top 12, a bottom 14 and four side walls 16, 18, 20, and 22. The bottom 14 is formed by a rectangular frame 24 which supports cross bars 26 to form a grill to support objects in the basket 10. In addition, the rectangular frame 24 supports corner risers 28 which extend to the top 12 and support a rectangular frame 30. The basket is completed by a plurality of wall risers 32 and cross support rods 34.

The corner risers 28 at the edges of the wall 18 and the rectangular frame 24 form corners for support brackets 36 which are secured thereto, as by welding. The support brackets 36 provide a depending plate portion 38 which is provided with an aperture 40, and an axle 42 extends through the apertures 40 of the brackets 36. A pair of wheels 44 are journaled on opposite ends of the axle 42 outwardly of the brackets 36, and the wheels form a support for the basket 10. A U-shaped handle 46 has a central cross member 48 and a pair of straight legs 50 which are secured to the basket at the top frame 30 and bottom frame 24, and the legs 50 extend beyond the lower edge of the lower frame 24 to terminate in snubbers 52, thus permitting the basket to rest upon the frame 30 in the resting position as shown in FIG. 1.

The axle 42 carries a pair of skis 54A and 54B mounted between the brackets 36. The skis 54A and 54B are identical in construction and are provied with an elongated flat surface 56 adapted to ride up on a snow covered surface, and an upwardly extending forward lip 58 to cuts its way through the snow. The skis are mounted on the axle 42 by a means which permits removal of the skis when the cart is used at the time of year when snow does not exist, that means including a block 60 and a bracket 62. Each block 60 has a flat lower surface 64 which engages a flat shim 63, and the shim 63 engages a flat upper surface 66 of the ski 54A or 54B. Each block 60 is mounted on the adjacent ski 54A or 54B by removable bolts 67 which extend through the shim 63. Each shim 63 may be removed and the ski 54A or 54B mounted directly on the block 60.

In addition, each block 60 has a second surface 68 which is flat and parallel to the first surface 60, and a recess 70 extends into the block 60 to accommodate the axle 42. The block also supports two protruding nubs 72 and 74, and a slide bar 76 has a slot 78 translatably disposed about the nub 74. The end of the slide bar 76 has a recess 80 for engaging the nub 72, and when the recess 80 of the slide bar 76 engages the nub 72, the slide bar retains the axle in position within the recess 70 of the block 60. The end of the slide bar 76 opposite the recess 80 extends upwardly in a flange 82 to facilitate translation of the slide bar with respect to the nubs 72 and 74. The entire assembly of skis and mounting means may be removed from the axle 42 by sliding the slide bars 76 away from the nubs 72 and permitting the assembly to drop downwardly to the earth.

The skis 54A and 54B are raised with respect to the wheels 44 and the surface of the earth by removing the shim 63 or replacing the shim 63 with a thinner shim. In like manner, the skis 54A and 54B may be lowered with respect to the surface of the earth by inserting a shim 63 with a greater thickness. The shims 63 are removed by removing the bolts 67.

In FIG. 1, the wheels 44 are shown in abutment on a bare surface designated 96. The lower surface 56 of the ski is shown disposed above the bare surface 96, thereby preventing the ski from impeding movement of the cart on the wheels 44. In FIG. 2, a layer of snow 98 is shown on the surface 96, and the wheels 44 sink into the soft snow 98 as the cart is drawn across the snow. However, the skis 54A and 54B become in contact with the upper surface of the snow 100, and indent the snow to a lesser degree than the wheels, thereby carrying the weight of the cart.

The inventor has found that the wheels 44 must depend below the flat surface 56 of the skis 54A and 54B by a distance between one-half and three inches in order to permit the ski to ride above the surface 96 of the earth on a bare surface and to still permit the ski to engage the snow 100 on a snow covered surface. Further, the assembly of ski and mounting means must have its center of gravity in the vertical plane transversing the axle 42 in order for the assembly of ski and mounting means to pivot directly beneath the axle with the flat surface 56 parallel to the surface 96 of the earth.

The shopping cart illustrated in the figures may be drawn across a bare surface by simply pulling the cross bar 48 of the handle 46. When a portion of the surface 96 is covered by a layer of snow, no change need be made. The person using the cart simply continues to draw upon the cross bar 48, and the skis 54A and 54B engage the snow. To make certain that the skis 54A and 54B continue to run substantially parallel to each other, a cross bar 94 is mounted on opposite ends on the blocks 60 of the skis 54A and 54B adjacent to the lips 58 of the skis. The cross bar 94 is removably mounted on the ski 54B by means of a pin 102 and on the ski 54A by means of a locking screw 104.

Those skilled in the art devise many uses for the present invention beyond that here set forth, and it is therefore intended that the scope of the present invention be not limited to the foregoing specification, but rather by the appended claims.

The invention claimed is:

1. A cart for use on a bare or a snow covered surface comprising, in combination, a cart having a supporting frame, an elongated axle mounted on the frame and below the frame, said axle having opposite end portions extending outwardly from the frame, a pair of wheels, one wheel of said pair being mounted on each end portion of the axle, said wheels being rotatable with respect to the frame and having perimeters adapted to ride on the bare surface and sink into a snow covered surface, an elongated ski having a substantially flat bottom surface adapted to ride on a snow covered surface, means attached to the ski for pivotally mounting the ski on the axle with the axis of elongation of the ski disposed in a plane normal to the axis of elongation of the axle, said mounting means comprising a block having a flat surface and a second surface opposite the flat surface, the flat surface being mounted on the ski opposite the bottom surface of the ski, said block having a recess extending in the second surface to accommodate the axle, and a plate translatably mounted on the second surface, said plate being translatable into a first position in which the plate extends over the recess to retain the axle in the recess and said plate being translatable to a second position remote from the recess, said mounting means including means for mounting a shim between the block and the ski for selecting the distance between the axle and the ski, said mounting means positioning the ski bottom surface remote from the axle and the combined center of gravity of said ski and said mounting means being disposed in a plane traversing the axis of elongation of the axle and normal to the axis of elongation of the ski, the distance between the axle and the bottom surface of the ski being between one-half inch and three inches less than the radius of the wheels, whereby the ski depends from the axle and is adapted to ride above a bare surface and engage a snow covered surface.

2. A cart for use on a bare or a snow covered surface comprising the combination of claim 1 in combination with a second ski identical to the first ski, and a second means for mounting the ski indentical to the first means for mounting the ski, said second ski being mounted on said second mounting means, said first and second mounting means being pivotally mounted on the axle between the wheels of the cart.

3. A cart for use on a bare or a snow covered surface comprising the combination of claim 1 wherein the means for mounting the ski on the axle includes a manually actuable means for releasing the mounting means from the axle.

4. A cart for use on a bare or a snow covered surface comprising the combination of claim 1 wherein the cart is provided with a basket open at the top and a handle whereby the cart may be manually transported over the surface.

* * * * *